UNITED STATES PATENT OFFICE.

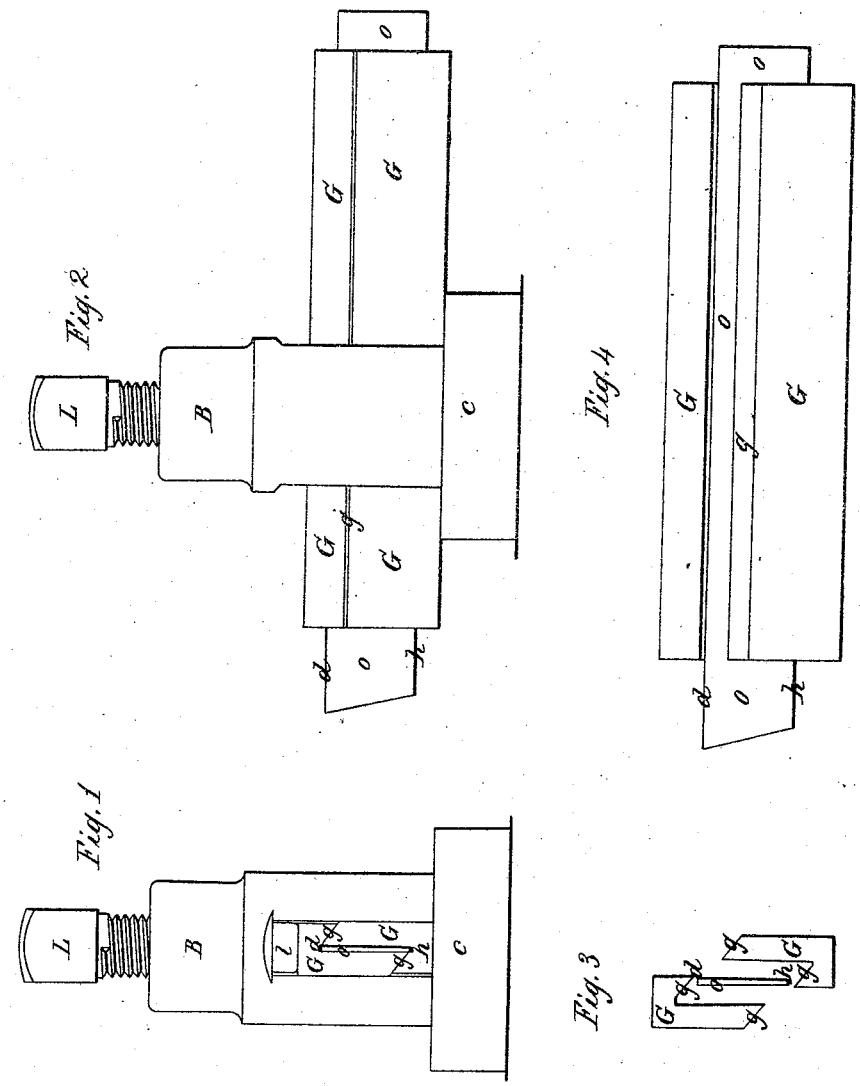

JOHN MOONEY, OF PROVIDENCE, RHODE ISLAND.

TOOL FOR CUTTING METALS.

Specification of Letters Patent No. 15,190, dated June 24, 1856.

*To all whom it may concern:*

Be it known that I, JOHN MOONEY, of Providence, in the county of Providence and State of Rhode Island, have invented a new and useful Improvement in Tools for Lathes, Planers, or other Machines for Working Metals; and I do hereby declare that the following is a full, clear, and exact description of the construction and operation of the same, reference being had to the annexed drawings and to the letters of reference marked thereon.

My invention consists in constructing that tool known as the cutting off tool used for cutting metals in the form of a blade of uniform width, with each edge of uniform thickness, (the edge upon which is formed the cutting point being thicker than the other opposite edge to avoid friction) and inclosing the same in a case or clamps, in such a manner that when placed in the tool post of the lathe, planer, or other machine, and the set screw brought to bear upon it, it may be held firmly, and solidly, as if constructed in one piece, as formerly.

The advantages which this tool possesses over that heretofore in use for this purpose are these: 1st, after making and squaring up the cases, or clamps, blades without number can be used in them, and the tool will always take the same position in the toolpost, as its position depends, not upon the blade used, but upon the clamps which hold it, and which always remain the same; 2nd, it is sometimes desirable to remove a great deal of stock at once, as is the case in grooving and splining shafting; at other times we wish to split up stock, and waste as little as possible, and the blades requisite for the accomplishment of both these ends, can be held in the same clamps; 3rd, where there is quite a thickness to cut through, we can begin with the blade projecting from the clamps but a very little, and as the cut grows deeper, slide the blade out, letting the sides of the stock support the thin blade, until we have cut to a far greater depth than is ever attempted with one of the old tools; 4th, this blade is tempered throughout its whole length at once, and need never be heated again. The old tool on the contrary must be tempered every time it is drawn out, which is the only way to lengthen it, should it break, or wear short; 5th, in fitting work together, where it is necessary to retain the same thickness of tool; if the point should break all that is necessary, is to grind it down to a new point, and the size is exactly the same as before with the temper untouched; thus an accident which with this tool is a mere annoyance, with a solid tool involves the labor of drawing out, retempering, and what is most difficult, and at the same time the most necessary, requisite grinding the cutting portion, to precisely the same thickness as before.

To enable others skilled in the art to make and use my invention, I will proceed to describe its construction, and operation by the accompanying drawings in which—

Figure 1, is a front elevation of the tool, in the tool post. Fig. 2, is a longitudinal elevation of the same. Fig. 3, is a front elevation of the tool and clamps, as separated from each other. Fig. 4 is a side elevation of the same.

The same letters refer to like parts in the different figures.

G, G, are the clamps constructed of either wrought or cast iron, and are of such dimensions as the tool post may require. They are then planed (as shown in Fig. 3) with a beveled edge on the outside of the long side, and also on the inside of the short side, of each part of the clamps, so that when the two parts G, G, are put together, with the outside bevel of each fitting against the inside bevel of the other, and having the blade between them, the whole shall form a perfect parallelogram, but as the blades are thicker at the cutting edge than at the other edge, the inside of each part of the clamps must be planed to receive the blade. As we cannot press the clamp as close together with a thick blade in them as with a thin one, it must be self evident to all, that the thicker the blade O is, the longer the space between the clamps must be. Therefore in making the blade, which is formed of a piece of sheet steel, care must be taken to proportion its width, to its thickness, so that when the sides of the clamps G, G, can not be pressed any closer together, on account of the thickness of the blade, the width of the blade will be just sufficient to fill the space allotted for its reception.

o is the blade of cast steel the cutting edge d of which is a trifle thicker than the opposite edge h, throughout its whole length.

The clamps G, G, containing the blade o, being placed within the tool post B, upon the collar C, and the point $l$, of the set screw L, brought to bear upon them (as shown in Figs. 1 and 2), the blade is held firmly and solidly, by the action of the set screw upon the beveled edges $g$, $g$, $g$, $g$, of the clamps in the manner shown. If while in use a greater length of blade is required—by loosening the set screw the blade may be projected therefrom without disturbing the position of the clamps in the tool post.

What I claim as my invention and desire to secure by Letters Patent, is—

The use of the blade or cutter $o$, of a separate piece of metal, inserted in an adjustable clamp G, constructed and operated in the manner and for the purpose as herein set forth.

JOHN MOONEY.

Witnesses:
JOHN R. RANDOLPH,
GEORGE PALMER.